June 2, 1953 A. P. JOURDAIN 2,640,351
DEVICE FOR MEASURING SOIL RESISTANCE
Filed June 7, 1950 2 Sheets-Sheet 1
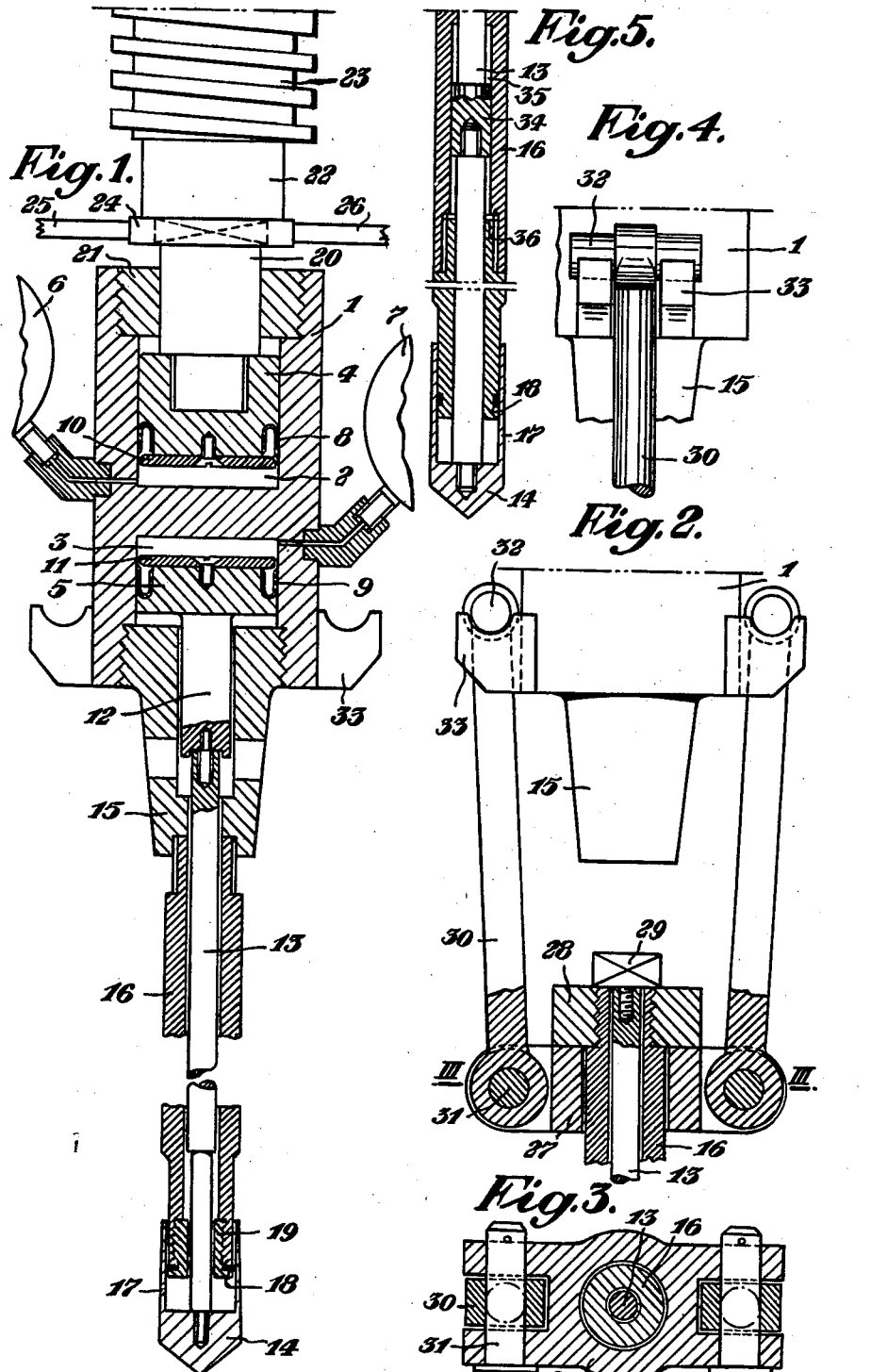
INVENTOR
ANDRE PAUL JOURDAIN
By: Haseltine, Lake &Co., AGENTS

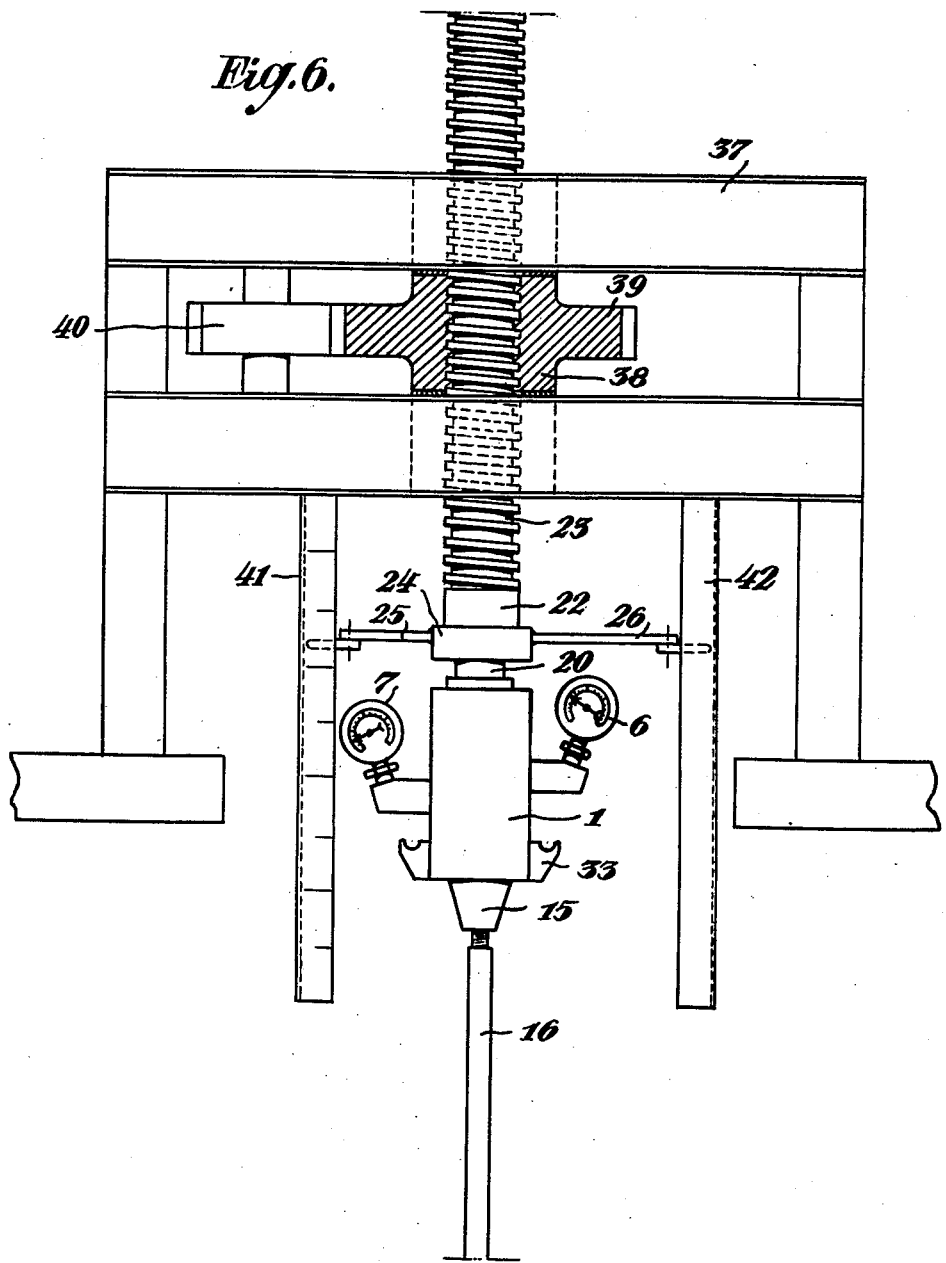

Patented June 2, 1953

2,640,351

UNITED STATES PATENT OFFICE 2,640,351

DEVICE FOR MEASURING SOIL RESISTANCE

André Paul Jourdain, Liege, Belgium, assignor to Compagnie Internationale des Pieux Armes Frankignoul, Societe Anonyme, Liege, Belgium Application June 7, 1950, Serial No. 166,740
In France June 16, 1949

4 Claims. (Cl. 73—84)

It is known to investigate the subsoil up to a great depth, especially in order to ascertain the bearing power thereof, by means of a boring device including a point which is driven into the soil through the medium of a rod that is guided with practically no friction in an outer sheath, a tight seal being provided at the bottom of the said sheath in order to prevent ingress of earth between the latter and the said rod.

In order to measure, on the one hand, the resistance from the subsoil to the penetration of the said point and, on the other hand, the resistance due to lateral friction against the sheath—which mean two magnitudes that should be known each for itself—it is necessary, when known devices are used, to drive in the first place the point and the sheath simultaneously, in order to ascertain the total resistance, and then to interrupt the driving and withdraw the mechanical means used for driving the sheath, and thereafter to perform driving of the point alone for a certain distance, and to measure separately the resistance encountered in driving the latter. The known method is therefore intricate and essentially non-continuous, which has a markedly retarding effect on the measuring action. Moreover, and as a result of the rather considerable relative movement of the point with respect to the sheath, ingress of earth between the rod and the sheath takes place unavoidably between the rod and the sheath despite the provision of a tight seal, thus causing the two members to jam, so that the results are completely fouled. Finally, special attention must be drawn to the circumstance that, owing to the fact that there is no continuous measurement of the force involved by the penetration, the readings provided by the known devices are insufficient to convey a full knowledge of the ground under prospection.

The present invention relates to a device that makes it possible to effect a continuous and simultaneous measurement of the two magnitudes in question, thus doing away with the aforesaid drawbacks of the known devices.

According to the invention, the device includes a piston connected to the rod of the boring point and mounted in a hydraulic cylinder adapted to act positively upon the sheath surrounding the said rod, means for measuring the pressure effective in the said cylinder and corresponding to the force applied upon the said piston, while the cylinder itself is submitted to a hydraulic pressure which is measured in turn and indicates the magnitude of the overall driving force. According to a preferred embodiment of the invention, the said cylinder is rigid with a second hydraulic cylinder coaxial therewith, the piston of which has imparted to it the total driving force.

By this means one has the possibility to measure, on the one hand, the total force to be applied in order to drive the point and the sheath and, on the other hand, the force required for driving the point alone. The two measurements may be effected in continuous and simultaneous way and all that is necessary in order to find out the force required for driving the sheath alone is to substract the two magnitudes from one another.

Further features and advantages of the invention will appear from the disclosure of one example of carrying the same into effect, as will be given hereinafter with reference to the accompanying diagrammatical drawings, in which:

Fig. 1 is an overall view, in vertical section, showing a preferred embodiment of the device according to the invention, such as used for driving.

Fig. 2 is a view, partly in vertical section, showing the device such as used for withdrawing.

Fig. 3 is a section on line III—III of Fig. 2.

Fig. 4 is a fragmentary view in side elevation of a detail of Fig. 2.

Fig. 5 is a fragmentary sectional view of a modified embodiment of a structural detail, and Fig. 6 is a partial elevational view of the device as mounted on a carriage.

As shown more particularly in Fig. 1, the device includes a body 1 provided with two cylindrical chambers 2, 3, in which coaxial pistons 4, 5 are arranged to slide. The chambers 2 and 3 are filled with oil, respective pressures being measured by the pressure gauges 6, 7, each communicating with one of the said chambers. The pistons are provided with packing seals 8, 9, e. g. of leather, which are retained by arresting plates 10, 11 secured by means of screws to the bottoms of the pistons.

The piston rod 12 bears upon the rod 13, which is secured, e. g. by means of screws, to the conical point 14 adapted to be driven into the ground. A hollow cone 15 is screwed into the lower end of the body 1 and has its lower end resting upon the sheath 16 encircling the rod 13, the upper end of the sheath being engaged in a cavity in the lower end of the cone 15. The cone serves as a guide for the rod 13 slidably mounted therein.

The sheath 16 is shorter than rod 13 and extends a certain distance short of the point 14 and its lower end is engaged in a sleeve 17 integral with the said point, a packing 18, e. g. of tallowed hemp, being adapted to secure a tight seal between the sheath and the sleeve. The said seal may be held in place by means of a ring 19, which is screwed into the lower end of the sheath and serves as a guide for the rod 13.

The piston rod 20 of the piston 4 is guided in a ring 21 screwed in the upper end of the body 1. The driving force is applied onto the head 22 of the rod 20 by a driving member providing a great length of travel, e. g. a driving screw 23.

The whole assembly is mounted upon a suitable support, e. g. a suitably weighted carriage 37 supporting the driving means, especially those for actuating the screw 23, together with the guiding means for the device according to the invention. The driving means shown in Fig. 6 include a nut 38 cooperating with the screw 23 and having an external tooth portion 39 in engagement with pinion 40 driven by any suitable conventional means. The guiding action may be secured e. g. by a yoke 24 embracing a square portion of the piston rod 20 of the piston 4, the said yoke being provided with two arms 25, 26, the ends of which are slidable in vertical guide members 41, 42 supported upon the said carriage. The guide member 41 has a scale for reading the driving amplitude.

When a driving force is applied onto the head 22, such force is transmitted by the piston 4 and the oil contained in the chamber 2 to the body 1, which will transmit simultaneously the force on the one hand directly to the sheath 16, and on the other hand to the rod 13 and the point 14 through the medium of the oil contained in the chamber 3 and of the piston 5. The overall driving force, which is transmitted through the body 1 and is measured by the pressure gauge 6, is automatically distributed between the sheath and the point, in accordance with the resistance encountered by those two members in the ground. The force necessary for overcoming the resistance encountered by the point is provided by the piston 5 exclusively and is therefore measured by the pressure gauge 7.

The outer diameter of the sleeve 17 is decreasing slightly from bottom to top. As a result, the sleeve is not subjected to friction from the ground against the lateral face thereof, so that the only magnitude measured through the medium of the point is the resistance from the subsoil to the penetration of the said point. The sheath 16 has an outer diameter that equals the largest diameter of the point and is therefore subjected solely to the lateral friction from the earth. The lower end of the sheath has a reduced diameter in order to provide for a free annular space required to allow for small relative movement of the sleeve around the sheath.

As the driving proceeds, extension sections are added, e. g. by screwing, to the rod 13 and the sheath 16. The extension sections of the sheath have the same diameter as the latter, their lower end portion being tapped so as to fit the screw threaded upper end portion of the preceding section. The length of travel of the driving member 23 should be at least equal to the length of each the said sections, e. g. from 1.5 to 2 metres.

It will be seen that the device according to the invention makes it possible to plot rapidly during each non-interrupted driving operation, a continuous diagram of the resistances encountered by the sheath and the point. Owing to the arrangement of the seal 18 within the sleeve 17 every risk of ingress of earth is practically eliminated, so that there is no reason to fear a mutual jamming between the rod 13 and the sheath 16, the relative movement between the two members being moreover quite limited.

The device according to the invention makes it possible to effect the withdrawal of the rod 13 and sheath 16, such as shown in Figs. 2–4, in a simple and expeditious manner. After the desired depth has been reached, the body 1 is raised slightly so as to disengage the pusher cone 15 and the piston rod 12 from the sheath 16 and the rod 13 respectively. A lifting annulus 27 is engaged around the sheath 16 and a ring 28 is screwed onto the upper end portion of the said sheath, while a screw having a wide head 29 is screwed into the upper end portion of the rod 13. Two lifting links 30 are pivotally connected to the annulus 27 by means of pins 31. The other ends of the links 30 terminate in heads 32 of hammer or like shape, which are engageable in two pairs of brackets 33 rigid with the body 1. Hence, as the body 1 is further being lifted, the links 30 and the annulus 27 are also lifted, the said annulus taking with it in turn the ring 28 together with the sheath 16. The ring 28 will next meet the projecting head of the screw 29 and then pull the latter upwards together with the rod 13.

Fig. 5 shows a modified embodiment of the component sections of the sheath 16 and the rod 13. Each component section of the rod 13 has its lower end formed with a thickened portion 34 arranged to enter a corresponding widened out portion 35 of the central bore of each of the sections of the sheath 16. In this instance the screw 29 (Fig. 2) is no more required, since, when the sheath is being lifted, each thickened portion 34 will abut the end shoulder 36 of the adjacent sheath section.

Fig. 5 also shows a modified constructional embodiment of the connection between the sleeve 17 and the lower end of the sheath 16, the packing ring 18 being located directly in a groove provided in that end of the sheath, so that the clamping ring 19 (Fig. 1) may be eliminated.

Fig. 5 does not show any clearance space between the relatively sliding members. In fact, the said members engage each other practically without friction. In Figs. 1 to 3, however, the clearance space between those members has been magnified for the clearness of the drawing.

It will be understood that the invention is not limited to the example of embodiment as described and illustrated, and that the same may be carried out in various structural forms.

I claim:

1. A device for measuring soil resistance, including a boring point to be driven into the ground, a rod operatively connected to said point, an outer sheath slidably arranged with practically no friction around said rod, a tight seal between the lower portions of the sheath and the rod, a body having a hydraulic cylinder at the lower end adapted to transmit a driving force to the said sheath, a piston mounted in said cylinder and adapted to transmit a driving force to the said rod, means for measuring the pressure effective in said cylinder, means for applying a hydraulic pressure onto said body, and means for measuring the latter hydraulic pressure.

2. A device for measuring soil resistance, including a boring point to be driven into the ground, a rod operatively connected to said point, an outer sheath slidably arranged with practically no friction around said rod, a tight seal between the lower portions of the sheath and the rod, a body having a hydraulic cylinder at the lower end adapted to transmit a driving force to the said sheath, a piston mounted in said cylinder, arranged coaxially above said rod and adapted to transmit a driving force thereto, means for measuring the pressure effective in said cylinder at the upper end thereof, a second cylinder arranged coaxially above said first cylinder and integral therewith, a second piston mounted in said second cylinder, means for exerting a driving force on said second piston, and means for measuring the pressure effective in said second cylinder.

3. A device according to claim 1, having a boring point terminating in a sleeve encircling the lower end portion of the said sheath, and a tight seal between the sleeve and the sheath.

4. A device according to claim 3, wherein the outer diameter of the sleeve slightly decreases from bottom to top.

ANDRÉ PAUL JOURDAIN.

References Cited in the file of this patent

FOREIGN PATENTS

| Number | Country | Date |
|--------|---------|------|
| 573,239 | Germany | Mar. 29, 1933 |
| 307,509 | Italy | May 6, 1933 |
| 600,259 | Germany | July 18, 1934 |
| 43,095 | Holland | May 16, 1938 |